(12) United States Patent
Uenishi et al.

(10) Patent No.: US 11,415,964 B2
(45) Date of Patent: *Aug. 16, 2022

(54) NUMERICAL CONTROL SYSTEM WITH DISTRIBUTED LOOK-AHEAD PROCESSING OF MULTIPLE NUMERICAL CONTROLLERS

(71) Applicant: FANUC CORPORATION, Yamanashi (JP)

(72) Inventors: Daisuke Uenishi, Yamanashi (JP); Chikara Tango, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 339 days.

This patent is subject to a terminal disclaimer.

(21) Appl. No.: 16/663,577

(22) Filed: Oct. 25, 2019

(65) Prior Publication Data
US 2020/0133241 A1 Apr. 30, 2020

(30) Foreign Application Priority Data
Oct. 31, 2018 (JP) .............................. JP2018-205703

(51) Int. Cl.
 *G05B 19/4155* (2006.01)
(52) U.S. Cl.
 CPC ..... *G05B 19/4155* (2013.01); *G05B 2219/32416* (2013.01); *G05B 2219/35386* (2013.01)
(58) Field of Classification Search
 CPC ...... G05B 19/4155; G05B 2219/32416; G05B 2219/35386; G05B 2219/35293; Y02P 90/02
 See application file for complete search history.

(56) References Cited

U.S. PATENT DOCUMENTS

2006/0229761 A1 10/2006 Kita et al.
2008/0024083 A1* 1/2008 Yamaguchi ........ G05B 19/4061
 318/569
(Continued)

FOREIGN PATENT DOCUMENTS

JP H07-191728 A 7/1995
JP H10-254517 A 9/1998
(Continued)

OTHER PUBLICATIONS

An Office Action mailed by the United States Patent and Trademark Office dated Dec. 8, 2021, which corresponds to U.S. Appl. No. 16/663,577 and is related to U.S. Appl. No. 16/663,577.
(Continued)

*Primary Examiner* — Kenneth M Lo
*Assistant Examiner* — Jonathan Michael Skrzycki
(74) *Attorney, Agent, or Firm* — Studebaker & Brackett PC (57) ABSTRACT

To provide a numerical controller that can detect a position in a machining program at which a speed control abnormality is likely to occur due to an insufficient look-ahead blocks that are used to determine an acceleration/deceleration operation, and start a look-ahead processing function from the position in parallel with looking ahead at the machining program from the start of the machining program in order to stabilize feed rate, cutting speed and other factors. A numerical controller includes a program execution unit that executes a machining program, a first program look-ahead unit and a second program look-ahead unit that simultaneously look ahead at the machining program from different blocks in the machining program in parallel with execution of the machining program, and a look-ahead allocation unit that divides a storage unit into a first region and a second region and instructs the first program look-ahead unit to
(Continued)

perform a look-ahead action of storing look-ahead blocks in the first region and instructs the second program look-ahead unit to perform a look-ahead action of storing look-ahead blocks in the second region.

4 Claims, 11 Drawing Sheets

(56) References Cited

U.S. PATENT DOCUMENTS

| | | | |
|---|---|---|---|
| 2008/0294877 | A1 | 11/2008 | Haga et al. |
| 2016/0375582 | A1* | 12/2016 | Nakajima ............... B25J 9/1666 700/255 |
| 2019/0278248 | A1* | 9/2019 | Sagasaki ................ B23Q 15/24 |
| 2020/0133242 | A1* | 4/2020 | Uenishi ................ G05B 19/408 |

FOREIGN PATENT DOCUMENTS

| | | | | |
|---|---|---|---|---|
| JP | 2001034320 A | * | 2/2001 | ............ G05B 19/18 |
| JP | 3723015 B2 | | 12/2005 | |

OTHER PUBLICATIONS

An Office Action; "Notice of Reasons for Refusal", mailed by the Japanese Patent Office dated Dec. 8, 2020, which corresponds to Japanese Patent Application No. 2018-205918 and is related to U.S. Appl. No. 16/663,577; with English language translation.

* cited by examiner

PRIOR ART

FIG. 11

NUMERICAL CONTROL SYSTEM WITH DISTRIBUTED LOOK-AHEAD PROCESSING OF MULTIPLE NUMERICAL CONTROLLERS

This application is based on and claims the benefit of priority from Japanese Patent Application No. 2018-205703, filed on 31 Oct. 2018, the content of which is incorporated herein by reference.

BACKGROUND OF THE INVENTION

Field of the Invention

The present invention relates to a numerical control system.

Related Art

In the manufacturing industry today, IT parts and other devices are being manufactured on smaller scales and with higher precision, and interest in high-speed and high-precision machining is on the rise. In order to achieve even higher quality in machining, there has been an increase in the number of workpiece machining programs for high-speed and high-precision machining that are created with tolerances on smaller orders.

Conventionally, machining programs with small tolerances could not realistically be used due to low computer processing power. However, in recent years, both computer performance and computer aided manufacturing (CAM) performance have improved to the point where machining programs with small tolerances can now be easily created, and this trend is expected to grow in years to come.

One aspect other than tolerance that is important when producing high-quality machining is uniformizing minute straight lines. Machining quality is increased when vibration is reduced through stabilizing acceleration/deceleration at each axle. As a result, there has been an increase in the number of high-quality machining programs featuring even minute straight lines. Therefore, machining programs are now made up of more blocks.

In the prior art, a numerical controller looks ahead at programs and reads out and processes a program for blocks to be executed next according to the first in, first out (FIFO) method from a number of programs stored in advance equal to look-ahead blocks. Then, the numerical controller determines an acceleration/deceleration operation and performs axis control.

However, such high-quality machining programs have the following problem. That is, the programs have short minute straight lines and fast command speed which means that, if the processing time for executing the program is shorter than the time required for look-ahead processing, the look-ahead blocks used to determine the acceleration/deceleration operation cannot be secured. As a result, acceleration/deceleration is not determined in consideration of program behavior and changes in speed are not constant and high-quality machining cannot be achieved.

Figure 11:
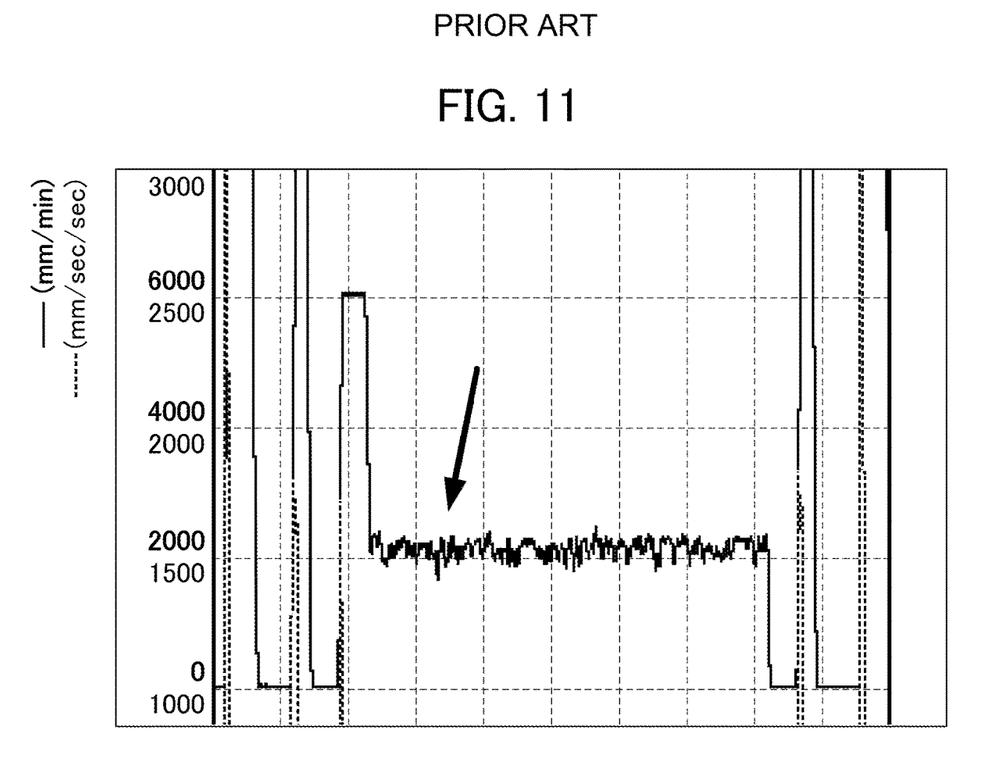
FIG. 11 is a graph for showing speed instability due to inability to secure look-ahead blocks.

FIG. 11 is a graph showing the difference in acceleration/deceleration over time when change in speed is unstable. As illustrated in FIG. 11, speed initially moves stably at a command speed of 6,000 mm/min. At 2,000 mm/min, processing time for executing the program is too short and the look-ahead blocks used to determine the acceleration/deceleration operation could not be secured. Therefore, speed became unstable and moved slightly as indicated by the arrow in FIG. 11. Such behavior is particularly significant when a machine tool has a large number of axes, such as in 5-axis machining, and the processing power of the numerical controller is decreased. These problems can be solved by increasing the processing power of the numerical controller used for looking ahead or executing machining programs. However, similar problems occur when command speed is further increased by making programs more detailed or updating machines.

In order to provide a solution to these problems, the invention described in Patent Document 1 discloses a technology in which a numerical controller monitors whether if there is a deficiency or an excess of data in a buffer that is held by the FIFO method until analysis data consisting of analyzed NC data is used as acceleration/deceleration interpolation means. In particular, the technology determines that there is insufficient data when the amount of data predicted to exist in the buffer falls below a lower limit threshold value.

Patent Document 1: Japanese Patent No. 3723015

SUMMARY OF THE INVENTION

An example of a position at which data is insufficient in a machining program is a position at which minute straight lines are continuous with each other, as described above. At such a position, a speed control abnormality occurs.

For example, when roughing, there is no machining process in which minute straight lines are continuous with each other. Instead, the look-ahead blocks are constantly at an upper limit and too much processing power may be used. When finishing, the tool needs to be replaced directly before machining starts and this stops the look-ahead function, or a cancel code enters the program and machining starts without a significant look-ahead blocks. As a result, the processing enters a machining portion at which minute straight lines are continuous and the look-ahead blocks become zero.

The technology disclosed in Patent Document 1 simply increases the priority of the NC data analysis processing task when it is determined that there is insufficient data and does not determine what data in the NC data is insufficient or at which position there is insufficient data, and is therefore unable to deal with speed control abnormalities at places where data is insufficient.

It is an object of the present invention to provide a numerical control system in which each of a plurality of numerical controllers that make up the numerical control system can request that another numerical controller look ahead at the machining program for the requesting numerical controller at a position at which look-ahead blocks are insufficient and a speed control abnormality is likely to occur, in parallel with the requester looking ahead at their own machining program, in order to stabilize feed rate, cutting speed and other factors.

(1) A numerical control system according to the present invention is a numerical control system (for example, a "numerical control system 10" to be described later) in which a plurality of numerical controllers (for example, "numerical controller 100" to be described later) are connected to each other via a network (for example, a "network 400" to be described later), the numerical controllers controlling a machine tool that has axes by executing a machining program that is made up of a plurality of blocks and that controls acceleration/deceleration of the axes, in which each numerical controller comprises a control unit (for example, a "CPU 11" to be described later) and a storage unit (for example, a "RAM 13" to be described later), the control unit comprising: a program execution unit (for example, a "program execution unit 111" to be described later) that executes the machining program; a program look-ahead unit (for example, a "program look-ahead unit 112" to be described later) that looks ahead at the machining program in parallel with execution of the machining program from different blocks in the machining program and includes a first program look-ahead unit and a second program look-ahead unit; and a look-ahead allocation unit (for example, a "look-ahead allocation unit 115" to be described later) that divides the storage unit into at least a first region and a second region and instructs the first program look-ahead unit to perform a look-ahead action of storing look-ahead blocks in the first region and instructs the second program look-ahead unit to look ahead at the machining program of another numerical controller and perform a look-ahead action of storing look-ahead blocks in the second region (2) In the numerical control system described in Item (1), the numerical controller may further include: look-ahead blocks calculation unit (for example, a "look-ahead blocks calculation unit 113" to be described later) that calculates look-ahead blocks, which is the difference between a first sequence number that is the number of a block being executed by the program execution unit and a second sequence number that is the number of a block that is looked ahead by the first program look-ahead unit while the block is being executed; and a program division unit (for example, a "program division unit 114" to be described later) that divides the machining program into a surplus look-ahead range in which the look-ahead blocks are more than or equal to a predetermined number and a substitute look-ahead range in which the look-ahead blocks are less than a prescribed value on the basis of the look-ahead blocks when the program execution unit runs a simulation, in which, when the program look-ahead unit looks ahead in the surplus look-ahead range, the look-ahead allocation unit may instruct the first program look-ahead unit to look ahead in that surplus look-ahead range and instruct the second program look-ahead unit to look ahead in the substitute look-ahead range of a machining program of another numerical controller and, when the program look-ahead unit looks ahead in the substitute look-ahead range, request that another numerical controller look ahead in that substitute look-ahead range and instruct the first program look-ahead unit to look ahead in that substitute look-ahead range.

(3) The numerical control system described in Item (1) or (2) may further include an adjustment device (for example, an "adjustment device 300" to be described later) that adjusts the machining timings of the plurality of numerical controllers such that, when one numerical controller looks ahead in the substitute look-ahead range of the machining program for that machine, another numerical controller does not look ahead in the substitute look-ahead range of that numerical controller.

(4) The numerical control system described in any one of Items (1) to (3), the plurality of numerical controllers may all execute the same machining program.

According to the present invention, each of a plurality of numerical controllers that make up the numerical control system can request that another numerical controller looks ahead at the machining program for the requesting numerical controller at a position at which look-ahead blocks are insufficient and a speed control abnormality is likely to occur, in parallel with the requester looking ahead at their own machining program, in order to stabilize feed rate, cutting speed and other factors.

DETAILED DESCRIPTION OF THE INVENTION

Now, an embodiment of the present invention is described with reference to FIGS. 1 to 10.

1. Configuration of Invention

Figure 1:
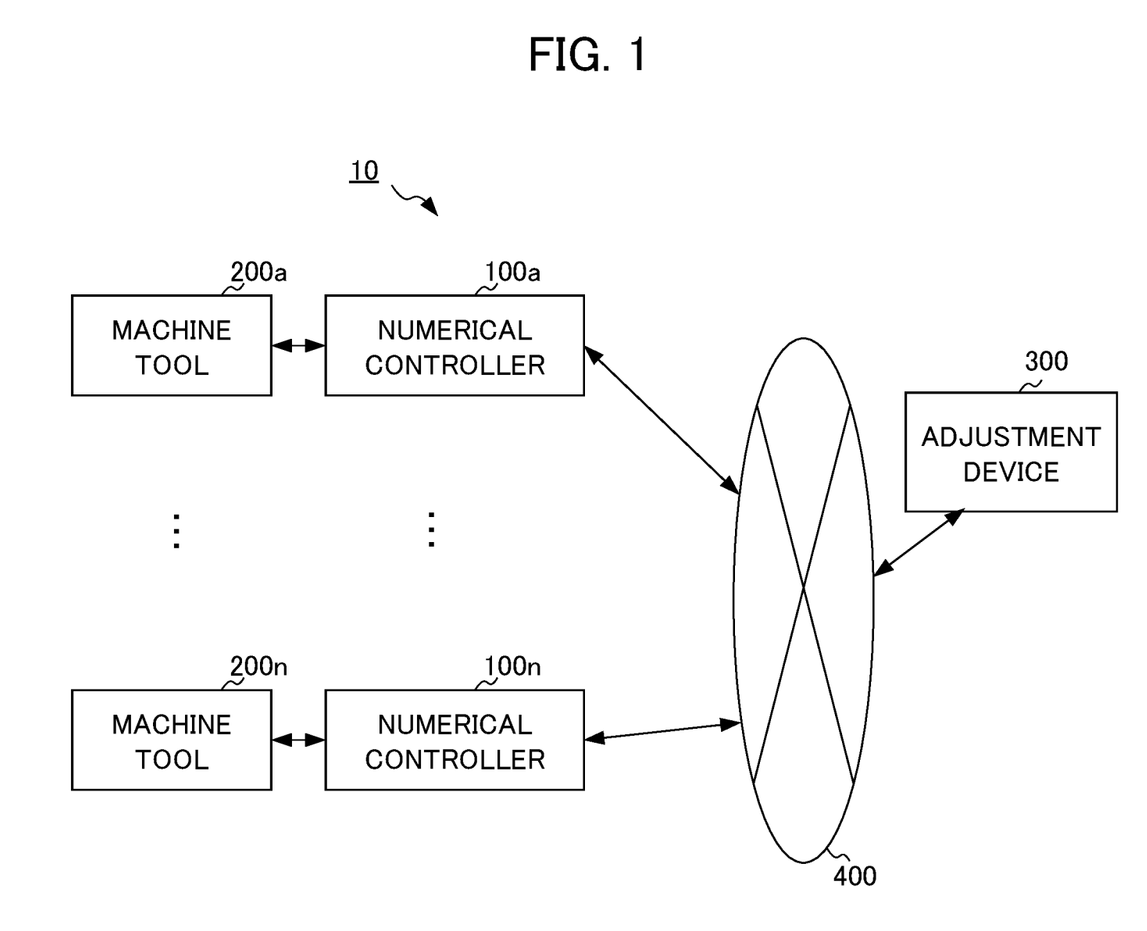
FIG. 1 is a diagram for illustrating the configuration of a numerical control system that includes numerical controllers according to an embodiment of the present invention.

FIG. 1 is a block diagram for illustrating a numerical control system 10 according to the present invention. As illustrated in FIG. 10, the numerical control system 10 includes n numerical controllers 100, n machine tools 200 and an adjustment device 300.

The numerical controller 100 is a machine that outputs an operation command to the machine tool 200 to numerically control the machine tool 200 using functions to be described later. A detailed description of the configuration and functions of the numerical controller 100 is provided later.

The machine tool 200 is a device that performs predetermined machining such as cutting. The machine tool 200 includes a motor that is driven to machine workpiece and a spindle and a feed axis that are attached to the motor. The machine tool 200 also includes fixtures and tools that correspond to the respective axes. The motor of the machine tool 200 is driven on the basis of an operation command that is output from the numerical controller 100 such that the machine tool 200 performs predetermined machining. Herein, the contents of the predetermined machining are not particularly limited and types of machining other than cutting, such as grinding, polishing, rolling or forging, may also be employed.

The adjustment device 300 is a device that adjusts the timing of machining by the machining tool 200, that is, execution of the machining program and look ahead by the numerical controller 100. Details of the adjustment of these timings are to be described later.

In this embodiment, the numerical controller 100 and the machine tool 200 are one pair and are connected to each other to allow communication between the two devices. A plurality of these pairs of the numerical controller 100 and the machine tool 200 may be disposed in one factory, or different pairs may be disposed in different factories.

The numerical controller 100 and the adjustment device 300 are connected to each other to allow communication between the two devices. The numerical controller 100, the machine tool 200 and the adjustment device 300 may be directly connected to each other via a connection interface, or may connected to each other over a network 400. The network 400 may be a local area network (LAN) installed in a factory, the Internet, a public phone network, or any combination thereof. The specific mode of communication in the network 400 is not particularly limited and may be a wired connection or a wireless connection.

Figure 2:
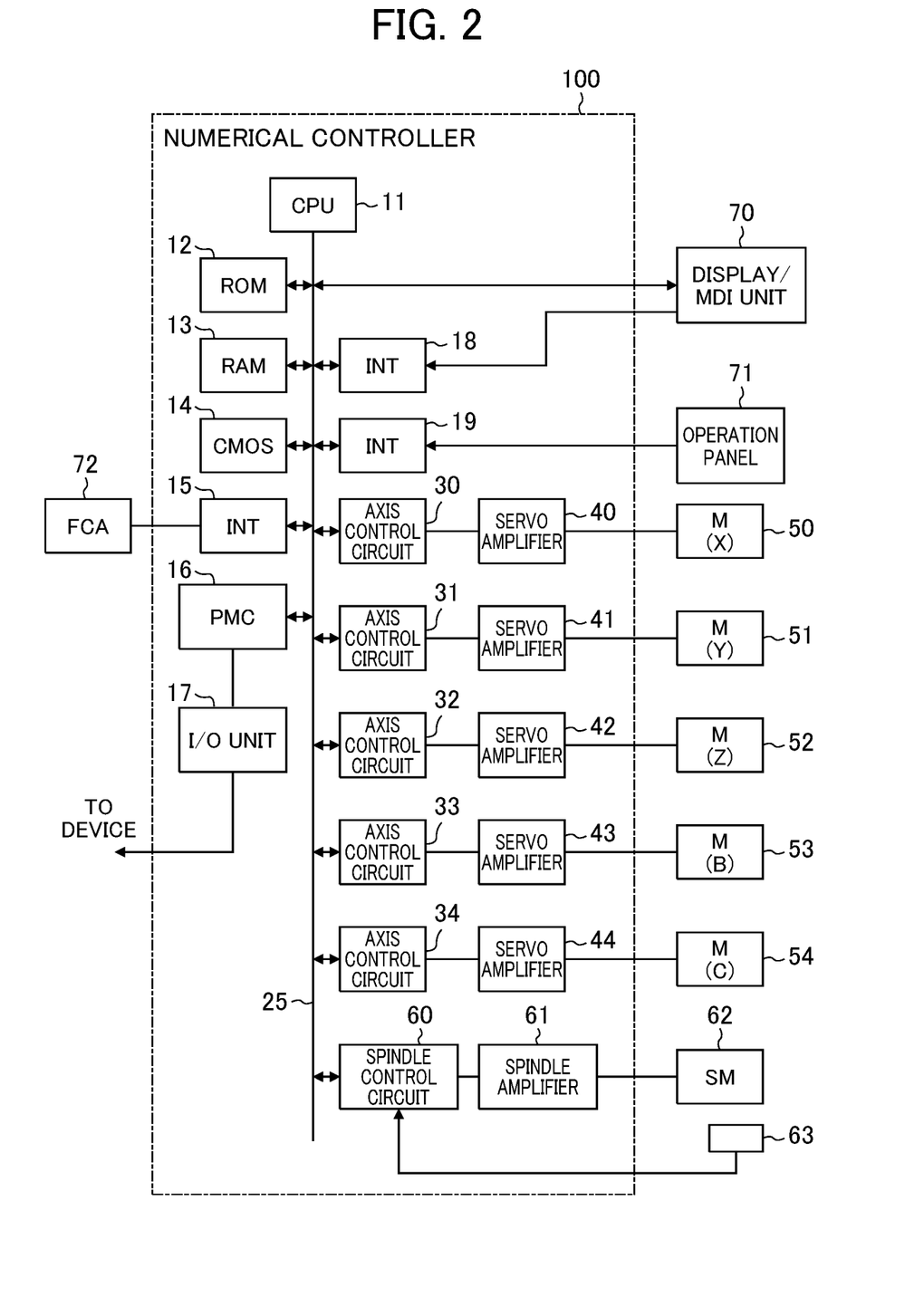
FIG. 2 is a diagram for illustrating the configuration of the numerical controller according to the embodiment of the present invention.

FIG. 2 illustrates an exemplary configuration of the numerical controller 100 according to the embodiment of the present invention. The numerical controller 100 primarily includes a CPU 11, a ROM 12, a RAM 13, a CMOS 14, interfaces 15, 18 and 19, a programmable machine controller (PMC) 16, an I/O unit 17, axis control circuits 30 to 34, servo amplifiers 40 to 44, a spindle control circuit 60, and a spindle amplifier 61.

The CPU 11 is a processor that controls the entire numerical controller 100. The CPU 11 reads out a system program that is stored in the ROM 12 via a bus 25 and controls the entire numerical controller 100 according to the system program.

The RAM 13 stores temporary calculation data and display data and various types of data that is input by an operator using a display/MDI unit 70.

The CMOS memory 14 is a non-volatile memory that is backed up by a battery (not shown) and that retains its storage state even when power to the numerical controller 100 is turned off. The CMOS memory 14 stores a machining program that was read to the CMOS memory 14 via the interface 15, a machining program that was input to the CMOS memory 14 via the display/MDI unit 70, and other data.

The ROM 12 is pre-written with various types of system programs for executing processing for an edit mode required to create and edit machining programs and processing for automatic operation.

Various types of machining programs such as the machining programs for implementing the present invention can be input using the interface 15 or the display/MDI unit 70 and stored in the CMOS memory 14.

The interface 15 can connect the numerical controller 100 to an external device 72 such as an adaptor. Machining programs, various parameters and other data are read from the external device 72 side. Machining programs that are edited within the numerical controller 100 can be stored in external storage means using the external device 72.

The programmable machine controller (PMC) 16 outputs signals via the I/O unit 17 to an auxiliary device (for example, an actuator in the form of a robot hand used for replacing tools) for a machine tool using a sequence program stored in the numerical controller 100 and controls the device. The PMC 16 receives signals such as those for various switches on an operation panel provided in the body of the machine tool, and transmits those signals to the CPU 11 after executing required signal processing.

The display/MDI unit 70 is a manual data input device that includes components such as a display and a keyboard. The interface 18 receives commands and data from a keyboard in the display/MDI unit 70 and transfers those commands and data to the CPU 11. The interface 19 is connected to an operation panel 71. The operation panel 71 includes a manual pulse generator.

The axis control circuits 30 to 34 for each axis receive movement command amounts for each axis from the CPU 11 and output the commands for each axis to the servo amplifiers 40 to 44.

The servo amplifiers 40 to 44 receive these commands and drive servo motors 50 to 54 for each axis. Each servo motor 50 to 54 for each axis includes a position/speed detector. The position/speed detectors output position/speed feedback signals that are fed back to each axis control circuit 30 to 34 to perform feedback control for position/speed. Note that this position/speed feedback is omitted from the block diagrams.

The spindle control circuit 60 receives a spindle rotation command for the machine tool and outputs a spindle speed signal to the spindle amplifier 61. The spindle amplifier 61 receives the spindle speed signal and rotates the spindle motor 62 of the machine tool at the commanded rotational speed to drive the tool.

The spindle motor 62 is connected to a pulse encoder 63 by a gear, a belt, or another component. The pulse encoder 63 outputs a feedback pulse in synchronization with rotation of the spindle. The feedback pulse is read by the CPU 11 via the bus 25.

In the exemplary configuration of the numerical controller 100 illustrated in FIG. 2, five axis control circuits (axis control circuits 30 to 34) and five servo motors (servo motors 50 to 54) are illustrated. However, the present invention is not limited to this configuration and any number of axis control circuits and servo motors may be provided.

Figure 3:
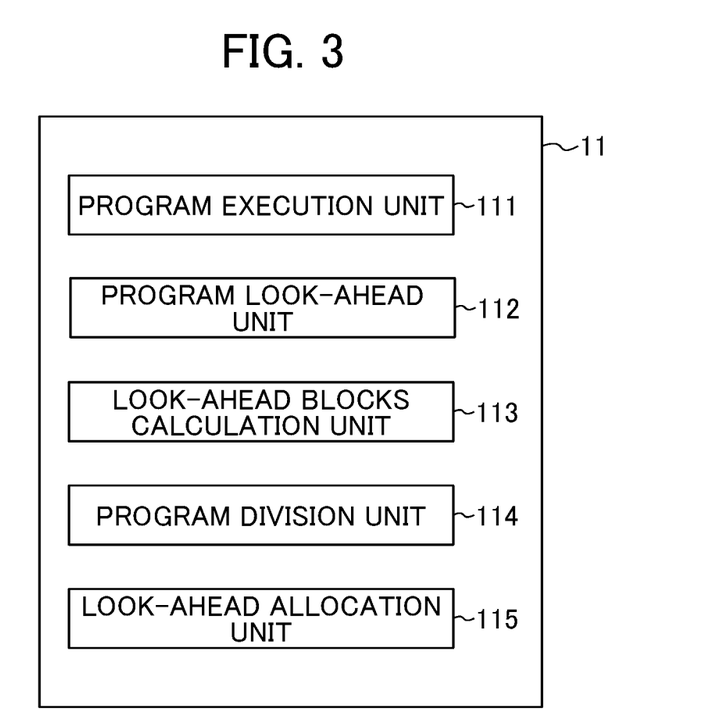
FIG. 3 is a diagram for illustrating function blocks for the numerical controller according to the embodiment of the present invention.

FIG. 3 is a function block diagram for illustrating a function where the CPU 11 reads out system programs and application programs stored in the ROM 12 via the bus 25 and implements the present invention according to those system programs and application programs. The CPU 11 includes a program execution unit 111, a program look-ahead unit 112, look-ahead blocks calculation unit 113, a program division unit 114 and a look-ahead allocation unit 115.

The program execution unit 111 executes a machining program. More specifically, in this embodiment, the program execution unit 111 executes a simulation of the machining program. During this simulation, it is preferable that workpiece is placed on the machine tool 200 and the machine tool 200 is actually operated, as opposed to executing the machining program idly. This is because the difference in look-ahead blocks over time (to be described later) changes depending on the operating environment and the axis configuration of the machine tool 200.

In parallel with the simulation of the machining program executed by the program execution unit 111, the program look-ahead unit 112 looks ahead at the machining program before the simulation is executed.

Figure 4:
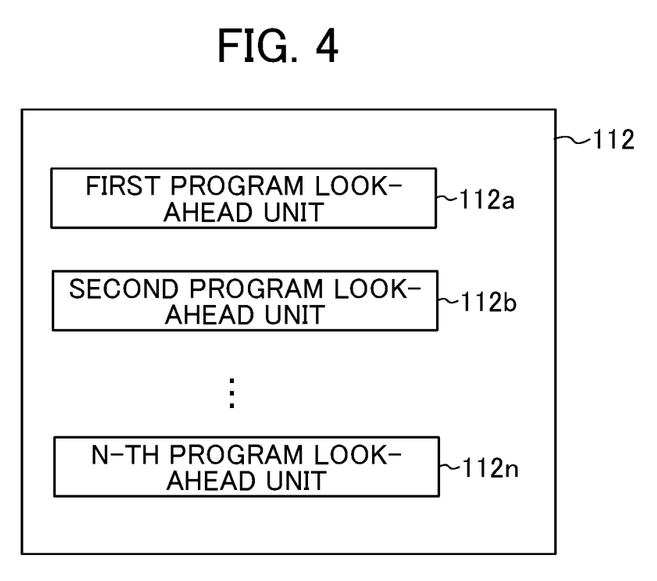
FIG. 4 is a diagram for illustrating function blocks for the numerical controller according to the embodiment of the present invention.

FIG. 4 illustrates an exemplary configuration of the program look-ahead unit 112. The program look-ahead unit 112 includes a first program look-ahead unit 112a, a second program look-ahead unit 112b until an n-th program look-ahead unit 112n.

The look-ahead blocks are zero when the position of a block to be looked ahead by the program look-ahead unit 112 or the position of a block to be executed by the program execution unit 111 reaches the end of the machining program. However, the look-ahead blocks do not usually evenly decrease to zero. The rate of reduction of look-ahead blocks changes depending on the processing time for each block, which differs due to a change in the curvature of the machining path or the axis configuration.

In particular, if the speed at which the program execution unit 111 executes the machining program becomes faster and the processing time for each block becomes shorter at a position in the machining program at which minute straight lines are continuous, the rate of reduction of look-ahead blocks will increase. When this happens, the look-ahead blocks that are used to determine the acceleration/deceleration operation cannot be secured and a speed control abnormality occurs in which change in speed is no longer constant.

Figure 5:
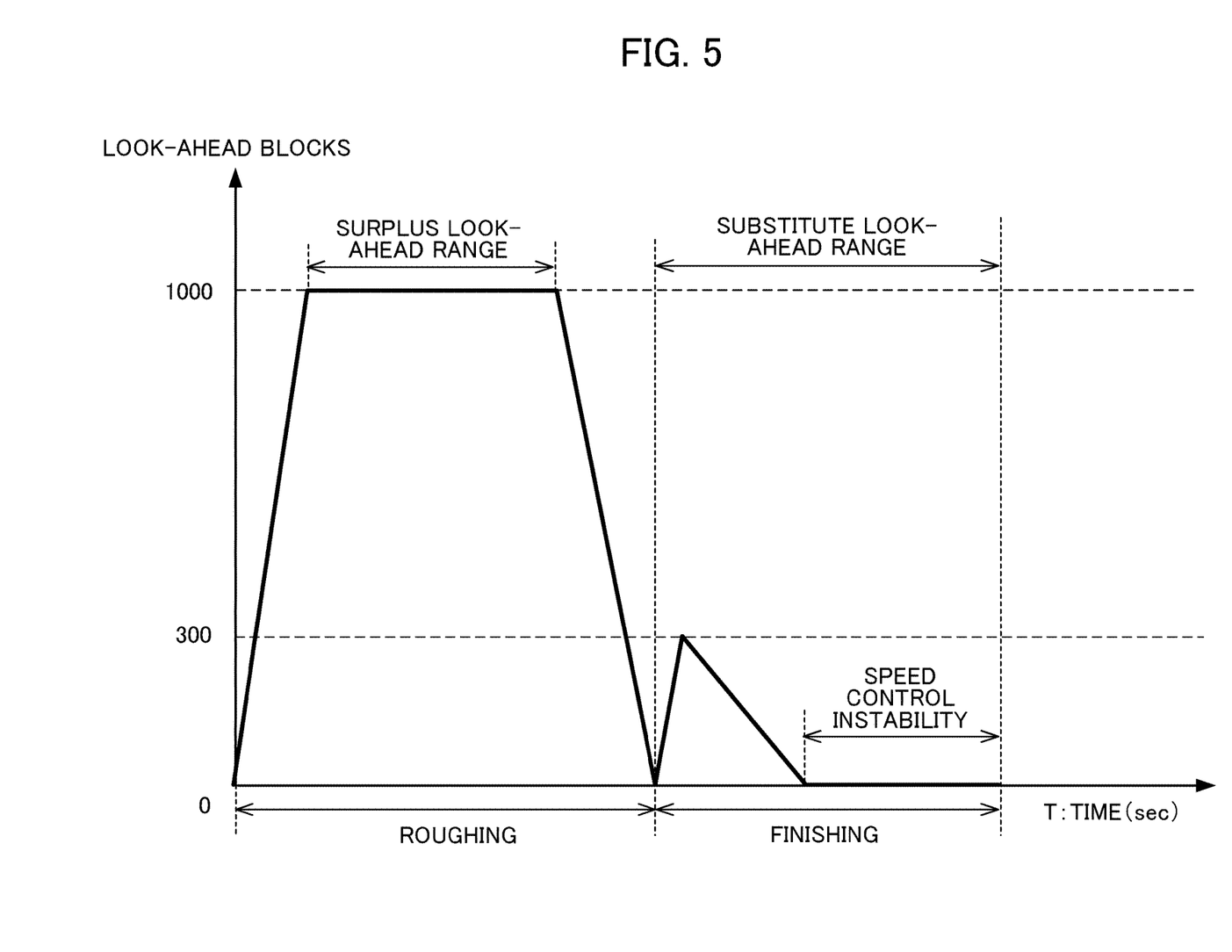
FIG. 5 is a diagram for illustrating difference in the look-ahead blocks over time and a surplus look-ahead range and substitute look-ahead range according to the embodiment of the present invention.

FIG. 5 is a graph for showing difference in the look-ahead blocks over time. During roughing, the maximum look-ahead blocks (1,000 blocks, which is considerably larger than the required look-ahead blocks, for example, 300 blocks) are maintained. Then, in a section at which the look-ahead function stops due to the tool needing to be replaced or a cancel code entering the program, the look-ahead blocks decrease and eventually become zero. The processing then moves to processing blocks that correspond to the finishing processing in the machining program. However, finishing is started while the look-ahead blocks only increase to 300, and hence the look-ahead blocks eventually become zero.

In this embodiment, as illustrated in FIG. 4, the program look-ahead unit 112 includes the plurality of program look-ahead units, that is, the first program look-ahead unit 112a, the second look-ahead unit 112b to the n-th program look-ahead unit 112n. In the machining program in a range in which there are enough look-ahead blocks, in parallel with the first program look-ahead unit 112a looking ahead from the start of the machining program, the second program look-ahead unit 112b to the n-th program look-ahead unit 112n perform a look-ahead action within a range in which there are not enough look-ahead blocks in a machining program that is executed by another numerical controller 100. In addition, the second program look-ahead unit 112b to the n-th program look-ahead unit 112n store the look-ahead blocks in the memory of their numerical controller 100. Then, when the other numerical controller 100 executes the block in the range in which there are not enough look-ahead blocks, the block that was already looked ahead by the second program look-ahead unit 112b to the n-th program look-ahead unit 112n and stored in the memory of the numerical controller 100 is executed and consumed.

In this embodiment, the term "range in which there are enough look-ahead blocks" is referred to as a "surplus look-ahead range" as illustrated in FIG. 5. Further, the term "range in which there are not enough look-ahead blocks" is referred to as a "substitute look-ahead range" as illustrated in FIG. 5.

For the sake of brevity, a case in which the program look-ahead unit 112 includes the first program look-ahead unit 112a and the second program look-ahead unit 112b is described here, but the present invention is not limited to this configuration.

The look-ahead blocks calculation unit 113 calculates the look-ahead blocks. This number is the difference between the sequence number of a block that is being executed by the program execution unit 111 and the sequence number of a block that is looked ahead by the program look-ahead unit 112 at the time when the first block is being executed.

In particular, in this embodiment, when the program execution unit 111 executes the first simulation of the machining program, the look-ahead blocks calculation unit 113 calculates the look-ahead blocks as the difference between a first sequence number of a block that is being executed and a second sequence number of a block that is looked ahead by the first program look-ahead unit 112a.

The program division unit 114 divides the machining program into the surplus look-ahead range in which the look-ahead blocks are more than or equal to a predetermined number and the substitute look-ahead range in which the look-ahead blocks are less than a prescribed value. As illustrated in the example in FIG. 5, the program division unit 114 may define a range in which the look-ahead blocks are maintained at a predetermined value or higher for a predetermined period of time as the surplus look-ahead range. The program division unit 114 may also define a range after the look-ahead blocks have become zero and until the look-ahead blocks exceed a predetermined value as the substitute look-ahead range.

The look-ahead allocation unit 115 divides a memory (for example, the RAM 13 described above) that stores the blocks looked-ahead by the program look-ahead unit 112 between a first region that is used by the first program look-ahead unit 112a and a second region that is used by the second program look-ahead unit 112b.

When the program look-ahead unit 112 looks ahead in the surplus look-ahead range, the look-ahead allocation unit 115 instructs the first program look-ahead unit 112a to perform look ahead in the surplus look-ahead range and instructs the second program look-ahead unit 112b to look ahead in a substitute look-ahead range in the machining program of another numerical controller in parallel with the look ahead action performed by the first program look-ahead unit 112a.

As a result, when the program look-ahead unit 112 looks ahead in the surplus look-ahead range, the first program look-ahead unit 112a stores look-ahead blocks in the first region while looking ahead in the surplus look-ahead range, and the second program look-ahead unit 112b stores look-ahead blocks in the second region while looking ahead in the substitute look-ahead range in the machining program of another numerical controller. The program execution unit 111 executes and consumes the blocks stores in the first region.

When the program look-ahead unit 112 looks ahead in the surplus look-ahead range, the look-ahead allocation unit 115 requests that another numerical controller 100 perform a look-ahead action in the substitute look-ahead range and instructs the first program look-ahead unit 112a to look ahead in the substitute look-ahead range.

If the program look-ahead unit 112 looks ahead in the substitute look-ahead range, the first program look-ahead unit 112a looks ahead at blocks after the blocks stored in the memory of the other numerical controller 100. After the program execution unit 111 has executed and consumed the blocks stored in the memory of the other numerical controller 100, the program execution unit 111 executes and consumes the blocks that are looked ahead by the first program look-ahead unit 112a and stored in the first region.

In the numerical controller 100 that has received the request to look ahead, if the first program look-ahead unit 112a is looking ahead in the surplus look-ahead range, the look-ahead allocation unit 115 instructs the second program look-ahead unit 112b to look ahead in the substitute look-ahead range in the machining program of another numerical controller, which is the machine that requested the look ahead.

Figure 6:
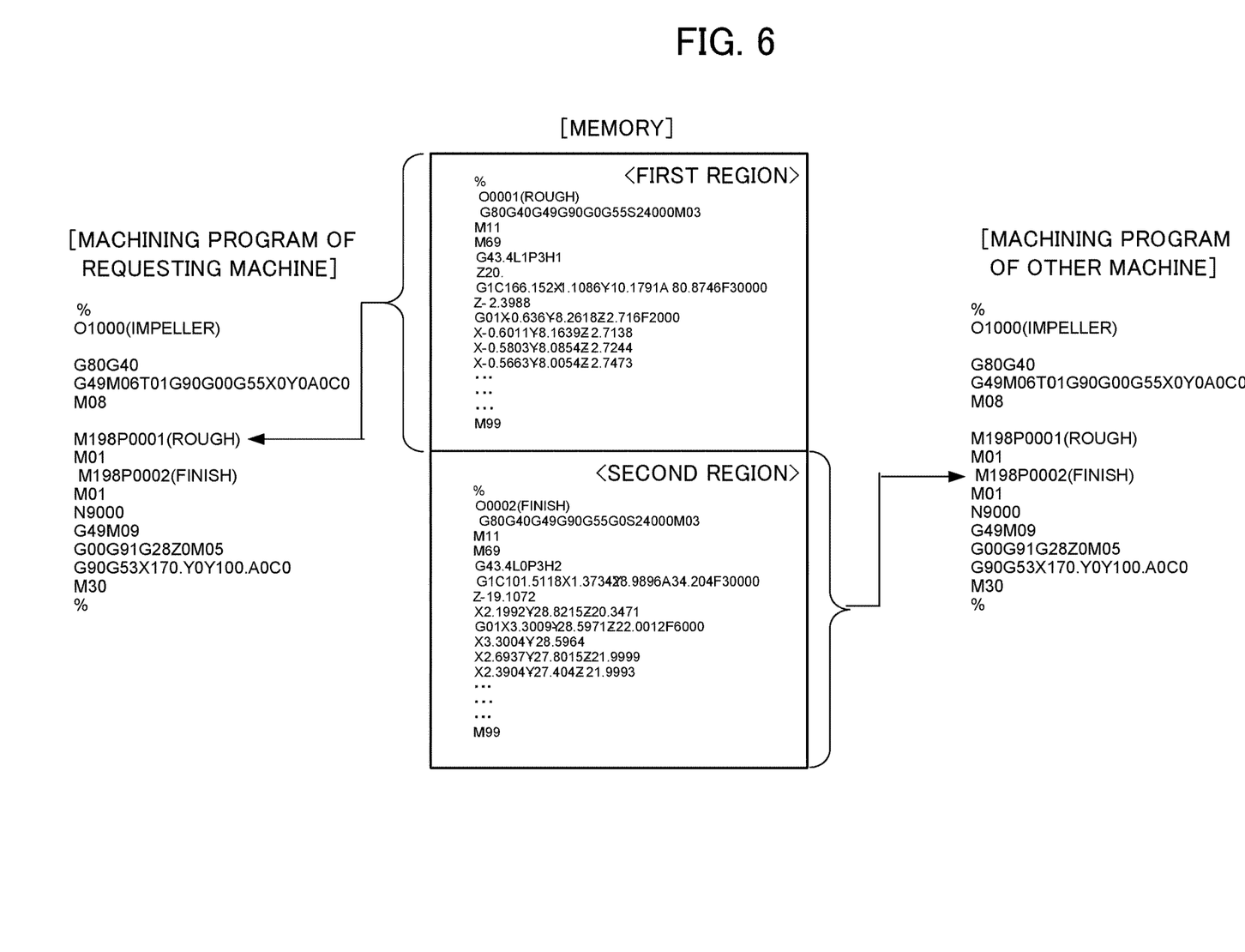
FIG. 6 is a diagram for illustrating an example of memory allocation performed by a look-ahead allocation unit according to the embodiment of the present invention.

FIG. 6 illustrates an example of look-ahead allocation by the look-ahead allocation unit 115. In the machining program illustrated in FIG. 6, the number "M198P0001 (ROUGH)" is an instruction for roughing and the number "M198P0002 (FINISH)" is an instruction for finishing.

The look-ahead allocation unit 115 divides 1,000 blocks, which is the upper limit of the memory, into 300 blocks to be used by the first program look-ahead unit 112a and 700 blocks to be used by the second program look-ahead unit 112b, and classifies the former blocks as the first region and the latter blocks as the second region. The look-ahead allocation unit 115 also instructs the first program look-ahead unit 112a to perform a look-ahead action of storing look-ahead blocks in the first region while looking ahead in the surplus look-ahead range and instructs the second program look-ahead unit 112b to perform a look-ahead action of storing look-ahead blocks in the second region while looking ahead in the substitute look-ahead range in the machining program of another numerical controller 100 in parallel with the look-ahead action performed by the first program look-ahead unit 112a.

Through configuring the numerical controller 100 according to this embodiment in this way, the numerical controller 100 can look ahead at the machining program for another numerical controller at a position at which there are enough look-ahead blocks in parallel with looking ahead at that machine's own machining program, and can request that another numerical controller look ahead at the machining program of the requesting machine at a position at which there are not enough look-ahead blocks and a speed control abnormality is likely to occur, in parallel with looking ahead at that machine's own machining program.

For the sake of brevity, the memory illustrated in FIG. 6 is divided into the first region and the second region, but this is merely an example and the present invention is not limited to this configuration. For example, the look-ahead allocation unit 115 may divide the memory into any number of regions according to the number of program look-ahead units 112a, 112b to 112n that make up the program look-ahead unit 112.

Figure 7:
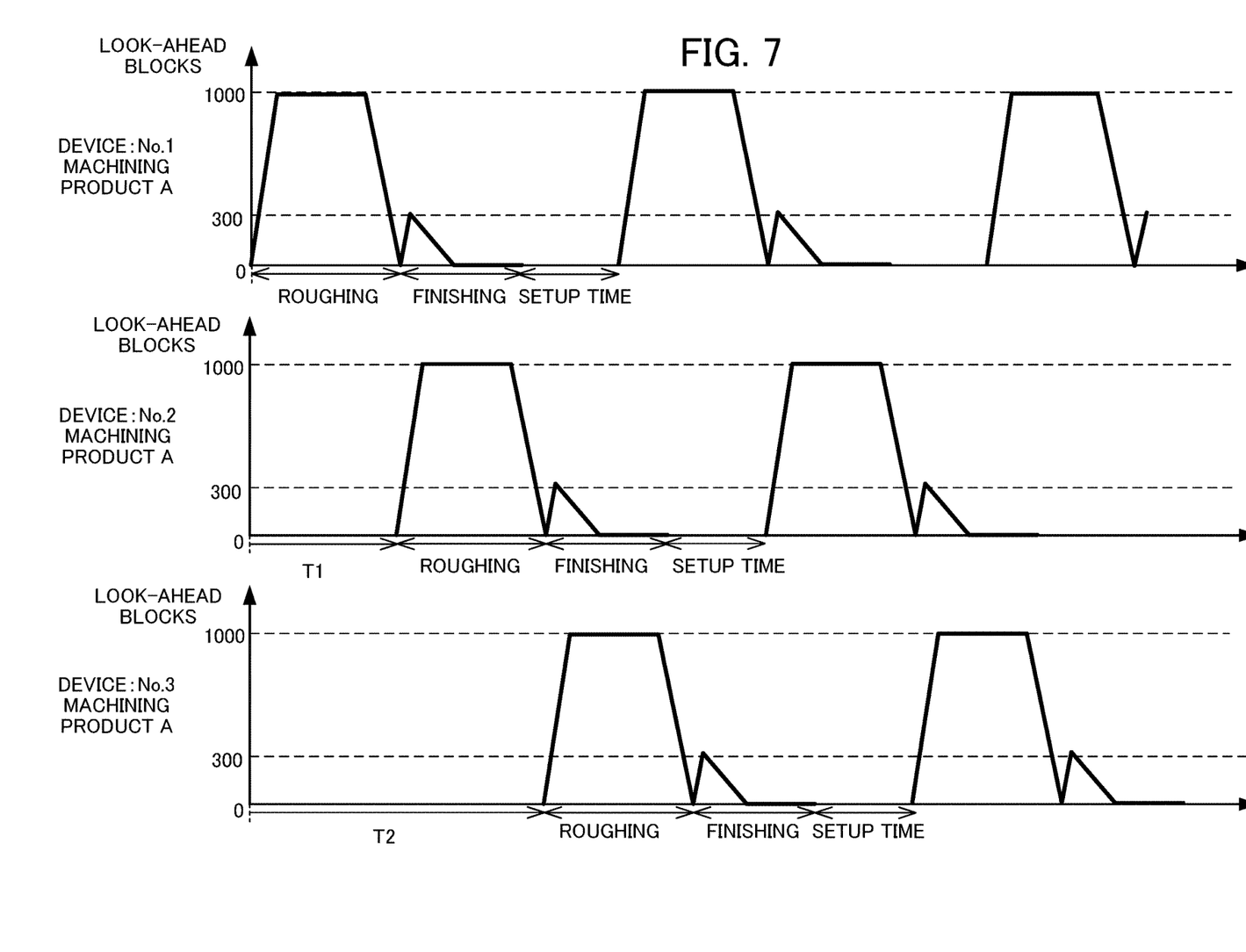
FIG. 7 is a diagram for illustrating machining timing and difference in the look-ahead blocks over time in each numerical controller according to the embodiment of the present invention.

FIG. 7 is a graph for showing the difference in look-ahead blocks over time in each of the numerical controllers 100 that control each machine tool 200. In FIG. 7, each of the machine tools for machines "No. 1" to "No. 3" iterate a loop of roughing, finishing and setup time. The look-ahead blocks in roughing and finishing are subject to the same difference over time as those illustrated in FIG. 5.

The adjustment machine 300 compares the look-ahead timing of the numerical controller 100 that controls the machine tool 200 of machine "No. 2" to the look-ahead timing of the numerical controller 100 that controls the machine tool 200 of machine "No. 1" and delays the look-ahead timing of the numerical controller 100 that controls the machine tool 200 of machine "No. 2" by T1. Similarly, the adjustment machine 300 compares the look-ahead timing of the numerical controller 100 that controls the machine tool 200 of machine "No. 3" to the look-ahead timing of the numerical controller 100 that controls the machine tool 200 of machine "No. 1" and delays the look-ahead timing of the numerical controller 100 that controls the machine tool 200 of machine "No. 3" by T2.

As a result, simultaneous execution of roughing and finishing can be prevented between the machine tools 200 of the machines "No. 1" to "No. 3". However, similar to that illustrated in FIG. 5, there are not enough look-ahead blocks when finishing at each numerical controller 100 when the adjustment machine 300 simply moves the look-ahead timing of each numerical controller 100. Therefore, the look-ahead allocation unit 115 allocates the look-ahead blocks between the plurality of numerical controllers 100 that control each of the machine tools 200.

Figure 8:
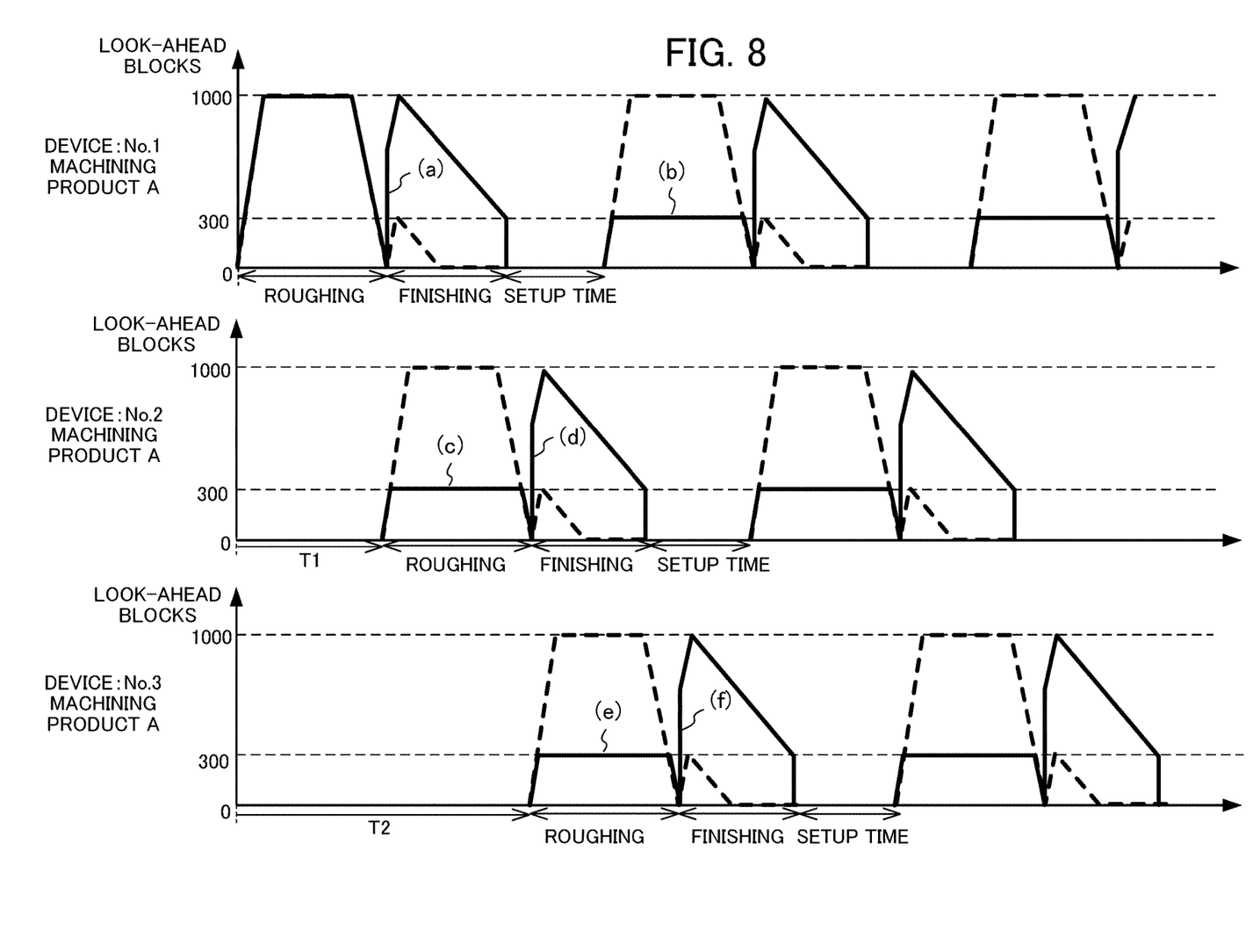
FIG. 8 is a diagram for illustrating machining timing and difference in the look-ahead blocks over time in each numerical controller according to the embodiment of the present invention.

FIG. 8 is a graph for showing the difference in the look-ahead blocks over time in each numerical controller 100 after the look-ahead allocation unit 115 has allocated look-ahead blocks to each numerical controller 100. More specifically, for example, in FIG. 8(a), the look-ahead blocks for machine "No. 2" is used to add 700 blocks to the look-ahead blocks for machine "No. 1". In FIG. 8(b), 700 blocks among the look-ahead blocks for machine "No. 1" are used for the look-ahead blocks for machine "No. 3". In FIG. 8(c), 700 blocks among the look-ahead blocks for machine "No. 2" are used for the look-ahead blocks for machine "No. 1". In FIG. 8(d), the look-ahead blocks for machine "No. 3" are used to add 700 blocks to the look-ahead blocks for machine "No. 2". In FIG. 8(e), 700 blocks among the look-ahead blocks for machine "No. 3" are used for the look-ahead blocks for machine "No. 2". In FIG. 8(f), the look-ahead blocks for machine "No. 1" are used to add 700 blocks to the look-ahead blocks for machine "No. 3".

With this configuration, are sufficient look-ahead blocks are generated when finishing in all of the machine tools 200 of the machines "No 1" to "No. 3".

In FIGS. 7 and 8, it is assumed that the machines "No. 1" to "No. 3" all machines the same product A, but this is merely an example and the present invention is not limited to this configuration.

2. Operation of Invention

Now, operation of the numerical controller 100 according to the first embodiment of the present invention is described with reference to FIGS. 9 and 10.

2.1 Operation when Dividing Machining Program

Figure 9:
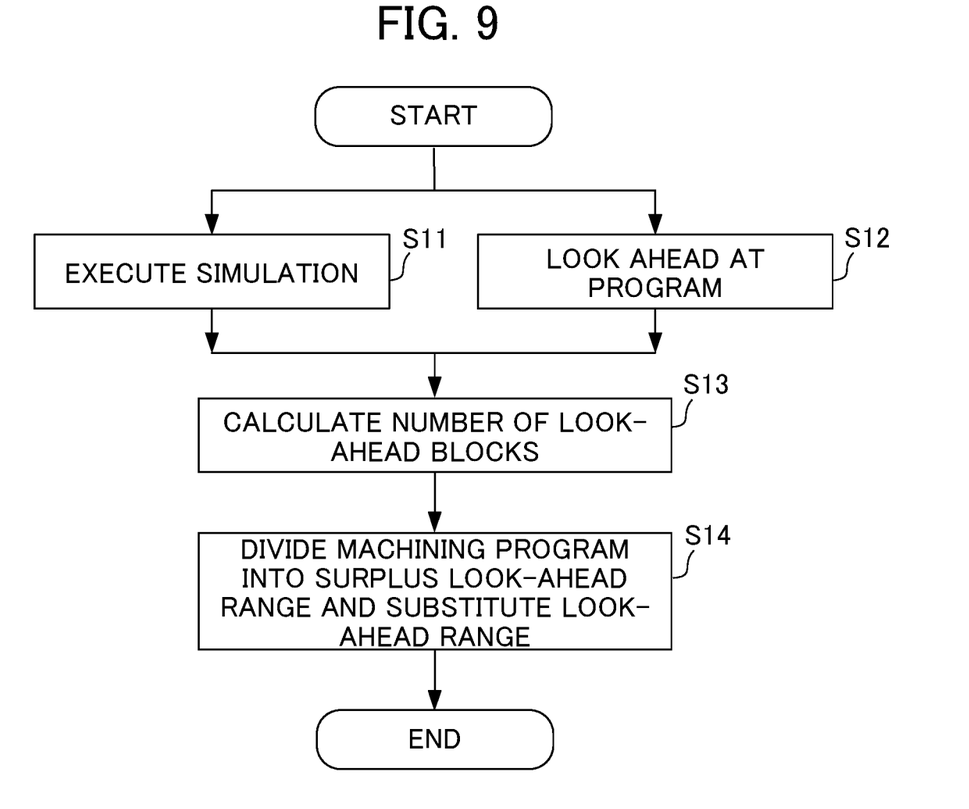
FIG. 9 is a flowchart for illustrating a first operation of the numerical controller according to the embodiment of the present invention.

FIG. 9 is a flowchart for illustrating the operation when the machining program is divided. In Step S11, the program execution unit 111 executes a simulation of the machining program.

In Step S12, in parallel with the machining program simulation executed by the program execution unit 111, the program look-ahead unit 112 (first program look-ahead unit 112a) looks ahead at the machining program before executing the simulation.

In Step S13, the look-ahead blocks calculation unit 113 calculates the look-ahead blocks.

In Step S14, the program division unit 114 divides the machining program into the surplus look-ahead range in which the look-ahead blocks are more than or equal to a predetermined number and the substitute look-ahead range in which the look-ahead blocks are less than a prescribed value.

2.2 Operation During Look-Ahead Allocation

Figure 10:
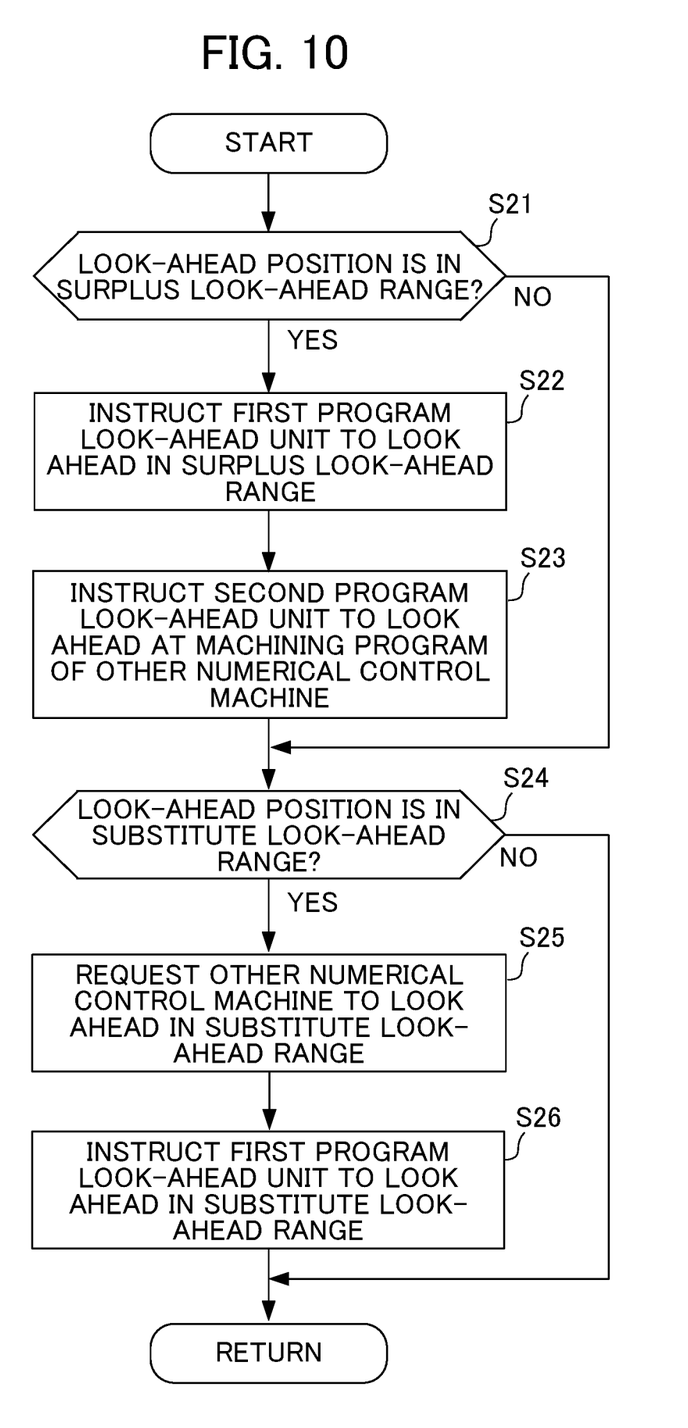
FIG. 10 is a flowchart for illustrating a second operation of the numerical controller according to the embodiment of the present invention

FIG. 10 is a flowchart for illustrating the operation during look-ahead allocation. In particular, FIG. 10 illustrates operation of the look-ahead allocation unit 115.

In Step S21, if the position to be looked ahead is in the surplus look-ahead range (S21: YES), the processing moves to Step S22. If the position to be looked ahead is not in the surplus look-ahead range (S21: NO), the processing moves to Step S24.

In Step S22, the look-ahead allocation unit 115 instructs the first program look-ahead unit 112a to perform a look-ahead action in the surplus look-ahead range.

In Step S23, the look-ahead allocation unit 115 instructs the second program look-ahead unit 112b to perform a look-ahead action in the substitute look-ahead range in the machining program of another numerical controller.

In Step S24, if the position to be looked ahead is in the substitute look-ahead range (S24: YES), the processing moves to Step S25. If the position to be looked ahead is not in the substitute look-ahead range (S24: NO), the processing moves to Step S21 (return).

In Step S25, the look-ahead allocation unit 115 instructs another numerical controller 100 to perform a look-ahead action in the substitute look-ahead range in the machining program of the numerical controller 100 of the look-ahead allocation unit 115.

In Step S26, the look-ahead allocation unit 115 instructs the first program look-ahead unit 112a to perform a look-ahead action in the substitute look-ahead range. Then, the processing moves to Step S21 (return).

3. Effects of First Embodiment

Each of the numerical controllers 100 that make up the numerical control system 10 according to the first embodiment of the present invention includes the program look-ahead unit 112 that includes the first program look-ahead unit 112a and the second program look-ahead unit 112b that look ahead at the machining program in parallel with execution of the machining program, and the look-ahead allocation unit 115 that divides a memory into at least a first region and a second region, instructs the first program look-ahead unit 112a to perform a look-ahead action of storing look-ahead blocks in the first region and instructs the second program look-ahead unit 112b to perform a look-ahead action of looking ahead at the machining program of another numerical controller and storing look-ahead blocks in the second region.

As a result, each of a plurality of numerical controllers that make up the numerical control system can request that another numerical controller look ahead at the machining program for the requesting numerical controller at a position at which a look-ahead blocks are insufficient and a speed control abnormality is likely to occur, in parallel with the requester looking ahead at their own machining program, in order to stabilize feed rate, cutting speed and other factors.

The numerical controller 100 includes the program division unit 114 that divides the machining program, on the basis of the look-ahead blocks, into the surplus look-ahead range in which the look-ahead blocks is more than or equal to a predetermined number and the substitute look-ahead range in which the look-ahead blocks are less than a prescribed value. Further, the numerical controller 100 includes the look-ahead allocation unit 115 and the look-ahead allocation unit 115 instructs the first program look-ahead unit 112a to look ahead in the surplus look-ahead range and instructs the second program look-ahead unit 112b to look ahead in the substitute look-ahead range in the machining program of another numerical controller 100 when the program look-ahead unit 112 looks ahead in the surplus look-ahead range. Further, the look-ahead allocation unit 115 requests that another numerical controller 100 look ahead in the substitute look-ahead range and instructs the first program look-ahead unit 112a to look ahead in the substitute look-ahead range.

As a result, the numerical controller 100 can request that another numerical controller 100 look ahead in a range in which there are not enough look-ahead blocks in the machining program.

When one numerical controller 100 looks ahead in the substitute look-ahead range of the machining program for that machine, the adjustment machine 300 adjusts the machining timing between the plurality of numerical controllers 100 such that another numerical controller 100 does not look ahead in the substitute look-ahead range of that numerical controller 100.

As a result, the look-ahead blocks can be seamlessly shared between the numerical controllers 100.

In addition, the plurality of numerical controllers 100 may execute the same machining program.

With this configuration, it is possible to seamlessly share the look-ahead blocks between the numerical controllers 100 and share the look-ahead blocks with a simple loop.

4. Modification Examples 4.1 Modification Example 1

In the above-described embodiment, the program division unit 114 divides the machining program into the surplus look-ahead range and the substitute look-ahead range on the basis of the look-ahead blocks, but the present invention is not limited to this configuration. For example, the program division unit 114 may divide the machining program into a plurality of regions on the basis of the result of comparing the rate of reduction of the look-ahead blocks and a prescribed value.

4.2 Modification Example 2

In the above-described embodiment, the operation when dividing the machining program is performed when the program execution unit 111 executes the simulation of the machining program, but the present invention is not limited to this configuration. For example, a similar operation may be performed during actual machining through the numerical controller 100 controlling the machine tool 200.

4.3 Modification Example 3

In the above-described embodiment, the numerical control system 10 includes the adjustment device 300 that adjusts the machining timing of the machine tool 200, that is, the execution timing of the machining program and the look-ahead timing by the numerical controller 100, but the present invention is not limited to this configuration. For example, the numerical control system 10 may not include the adjustment device 300 and the above-described timings may be autonomously adjusted through the plurality of numerical controllers 100 communicating with each other.

Embodiments of the present invention have been described above, but the present invention is not limited to the above-described embodiments. Any described effects are merely the best effects achieved by the present invention and are not limited to the description provided herein.

The control method used by the numerical controller 100 or 100A is implemented by software. When using software, the programs that constitute said software are installed on a computer (numerical controller 100 or 100A). These programs may be recorded on a removable medium and distributed to a user or may be made available as a file to be downloaded to a user's computer via a network. These programs may also be provided to a user's computer (numerical controller 100 or 100A) as an Internet service via a network, instead of being downloaded.

EXPLANATION OF REFERENCE NUMERALS 10 control system
100 numerical controller
111 program execution unit
112, 112a, 112b, 112n program look-ahead unit
113 look-ahead blocks calculation unit
114 program division unit
115 look-ahead allocation unit
200 machine tool
300 adjustment machine

What is claimed is:

1. A numerical control system wherein a plurality of numerical controllers are connected to each other via a network, the numerical controllers controlling a machine tool that has axes to control acceleration/deceleration of the axes,
wherein each of the plurality of numerical controllers comprises
a processor including a plurality of look-ahead sections and a storage device,
the processor is configured to:
execute a first machining program that is made up of a plurality of blocks;
look ahead at the first machining program in parallel with execution of the first machining program; and
divide the storage device into a number of regions according to a number of the plurality of look-ahead sections of the processor, and to instruct a first section of the plurality of look-ahead sections of the processor to perform a look-ahead action of storing look-ahead blocks in a first region of the plurality of divided regions of the storage device and to instruct a second section of the plurality of look-ahead sections of the processor to look ahead at a second machining program of another one of the plurality of numerical controllers and to perform a look-ahead action of storing look-ahead blocks in a second region of the plurality of divided regions of the storage device.

2. The numerical control system according to claim 1, wherein the processor is further configured to:
calculate a number of the look-ahead blocks, wherein the number of the look-ahead blocks is a difference between a first sequence number that is the number of a block being executed and a second sequence number that is the number of a block that is being looked ahead by the processor while the block is being executed; and
divide the first machining program into a surplus look-ahead range in which the calculated number of the look-ahead blocks is more than or equal to a predetermined number and a substitute look-ahead range in which the calculated number of the look-ahead blocks is less than a prescribed value on the basis of the calculated number of the look-ahead blocks when the processor runs a simulation,
wherein, when looking ahead in the surplus look-ahead range, the processor instructs the first section to look ahead in that surplus look-ahead range and instructs the second section to look ahead in the substitute look-ahead range of the second machining program of the another numerical controller and, when looking ahead in the substitute look-ahead range, requests that the another numerical controller look ahead in that substitute look-ahead range and instructs the first section to look ahead in that substitute look-ahead range.

3. The numerical control system according to claim 1, further comprising an adjustment machine connected to each of the processors and configured to communicate with each of the processors to adjust the machining timings of the plurality of numerical controllers such that, when one numerical controller looks ahead in a substitute look-ahead range, in which a number of the look-ahead blocks is less than a prescribed value, of the first machining program for that machine, the another numerical controller does not look ahead in the substitute look-ahead range of that numerical controller,
wherein the number of the look-ahead blocks is a difference between a first sequence number that is the number of a block being executed and a second sequence number that is the number of a block that is being looked ahead by the processor.

4. The numerical control system according to claim 1, wherein the plurality of numerical controllers all execute the same machining program.

* * * * *